Oct. 2, 1951     K. A. FISCHER     2,569,466

CALCULATOR

Filed Aug. 2, 1949

Inventor

Karl A. Fischer

W. J. Eccleston
ATTORNEY

Patented Oct. 2, 1951

2,569,466

UNITED STATES PATENT OFFICE 2,569,466

CALCULATOR

Karl A. Fischer, College Park, Md.

Application August 2, 1949, Serial No. 108,177

4 Claims. (Cl. 235—84)

(Granted under the act of March 3, 1883, as amended April 30, 1928; 370 O. G. 757)

The invention described herein if patented, may be manufactured and used by or for the Government for governmental purposes without the payment to me of any royalty thereon.

This invention relates to a slide rule and a basic change (new method) in calculating operations. More particularly the invention will be illustrated by a circular slide rule which simplifies and basically changes the calculating operation of multiplication, division, raising to a power or extracting of roots to simple mechanical addition or subtraction of logarithmic length units without use of a moving hair line or rider and simplifies movements of logarithmic scales.

Numerous modifications and changes have been made in attempts to improve the normally straight slide rule by providing circular structures which still operate basically upon the known and usual mutual reciprocating principle of duplicate or comparable scales. Any improvements in either, pertains more or less to the addition of new auxiliary scales and structure to which they are applied without measurably changing the mode of operation of the instrument.

Accordingly, it is an object of this invention to improve and simplify slide rule calculations.

It is another object of this invention to provide an improved slide rule structure having an immovable or stationary indicating hair line which automatically cooperates with an identical pair of logarithmic scales to provide a simplified method of addition and subtraction.

A further object of this invention is to provide an improved slide rule of simple design and capable of simplified continued operation with multiples of mixed or involved multiplications and divisions and eliminate many sources of errors ordinarily occurring in the operation of conventional slide rule structures.

Further objects, advantages and adaptations will be apparent from the accompanying description of the attached drawings wherein.

Figure 1:
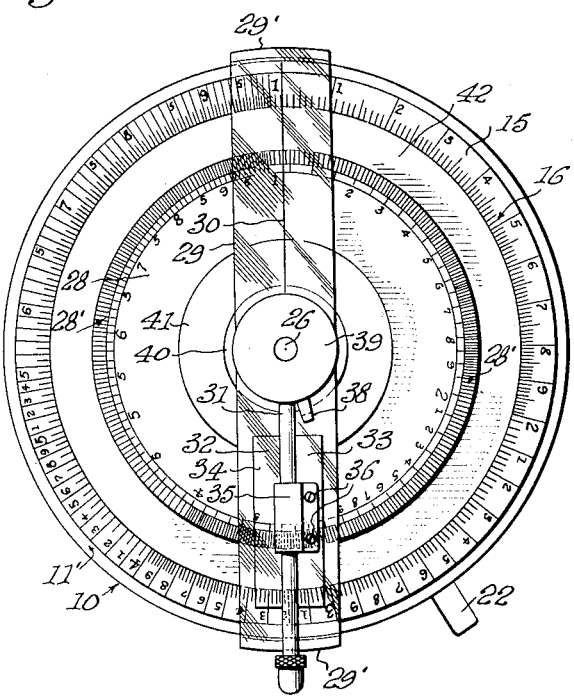
Fig. 1 is a top plan view of an illustrative device embodying this invention.
Figure 2:
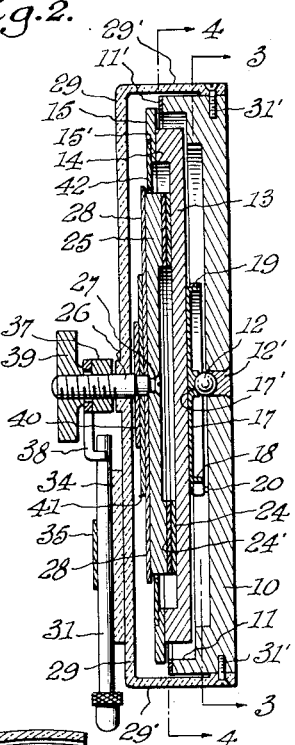
Fig. 2 is a cross-sectional side view of Fig. 1.
Figure 3:
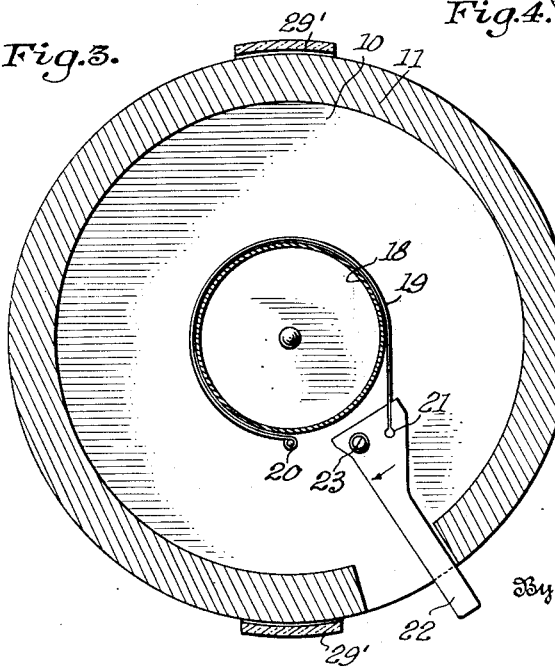
Fig. 3 is a sectional view taken on line 3—3 of Fig. 2.
Figure 4:
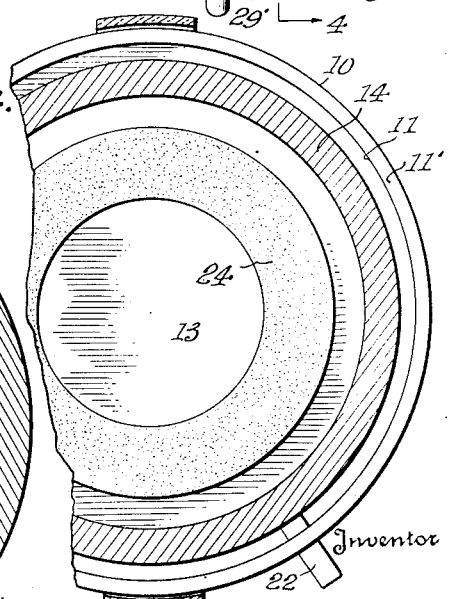
Fig. 4 is a sectional view taken on line 4—4 of Fig. 2.

As heretofore indicated, the illustrative structure is circular in shape consisting of a base 10, of wood, metal, plastic or the like, having an upstanding edge rib 11 provided with a slip plate or coating surface 11' and within which is carried, by bearing 12 mounted on bearing screw 12' secured in base 10, a balanced circular disc 13. The disc 13 is provided with an upstanding edge rib 14 carrying a face plate 15 upon which the logarithmic scale 16 is inscribed. On the bottom side of disc 13 is secured a circular bearing plate 17 provided with a bearing seat 17' and right angularly extended edge portions 18 which form a shallow brake drum for circular brake band 19. The band 19 encircles the shallow drum formed by edge portions 18 and is secured at its one end, by pin 20, and at its opposite end by pin 21 to the lever arm 22. This lever arm 22 is secured by and pivoted about pin 23 to apply tension on band 19 upon movement of lever 22 to control the rotation of disc 13, in the manner as hereinafter described.

Secured to the upper surface of disc 13 is a friction clutch 24 which engages friction clutch 24. The clutch 24 is secured to and carried by an inner circular disc 25 tightly mounted on a turn screw 26 by the fastening screw 27 which is threaded into the base portion of screw 26. A further face plate 28 upon which is inscribed logarithmic scale 28', calibrated to match the logarithmic scale 16, is secured to the top surface of disc 25 and cooperates with plate 15 in making calculations, in the manner as hereinafter described.

The turn screw 26 is positioned centrally of a transparent plastic cross bar 29 which is secured by its end members 29' and screws 31' to the casing formed by base 10 and sides 11. Longitudinally of the cross bar 29, on one side of the holding and turn screw 26 is a fixed indicating or hair line 30 and on the opposite side is a movable abutment pin 31 mounted for slippage on base 34 between guideways 32 and 33 by the spring clip 35 held by screws 36 turned into guideway 33. Fitted about the upper end of turn screw 26 is a threaded washer ring 37 and a stop member 38 which is tightly secured against ring 37 by turning knob 39. The stop 38 is adjusted to meet abutment pin 31 at the exact zero point of logarithmic scale 28 when it falls under indicator line 30. The washer ring 37 is in tight fitting relationship to the turn screw 26, stop 38 and knob 39 and in loose fitting relationship to bar 29 so as to prevent a binding action therebetween upon rotation of the discs 13 and 25. Further sliding washers 40 and 41 are secured to the surface of logarithmic scale 28 and inner surface of cross bar 29 respectively, to prevent binding when tension is placed on bearing 12 by turning of the bearing holding screw 12'. To provide a distinctive separation between the scale discs a washer 42 of contrasting color is secured to the inner groove edge 15' of the face plate 15. The portions comprising slip surface 11', face plate 15, contrasting color surface 15', bearing plate 17, friction clutch surfaces 24 and 24', face plate 28, and washers 40 and 41 may be secured by suitable rubber or resin adhesives, or form an integral portion of their component parts, as most desirable, to provide permanent attachments and smooth sliding and/or friction surfaces which do not bind or turn with undue friction.

To illustrate a simple mathematical calculation which may be performed by the improved apparatus set forth, it may be presumed that multiplication is desired. In this event, both scales are first placed at zero under the hair line 30, as the starting point, the disc 25 is turned by knob 39 to place the desired figure on the logarithmic scale under the hair line 30. By leaving the brake released, and due to the friction clutch facings 24' and 24, the disc 13 will turn logarithmic scale 16 to the same number under the hair line. The brake band 19 is then applied by placing tension thereon through movement of lever 22, stopping rotation of disc 13. The disc 25 is then rotated back by knob 39 until stop 38 contacts abutment pin 31 and the second figure is dialed under the hair line 30 by disc 25 being again rotated with disc 13 upon release of lever 22 which removes tension on brake band 19. Having positioned the first number on logarithmic scale 16 under the hair line 30 and adding the exact length unit by positioning the second number of logarithmic scale 28 under the hair line 30, there is obtained an accurate length unit reading on scale 16 at the new point positioned under the hair line 30. Further, an indefinite series of multiplication can be carried forward by setting the brake band 19 and returning the disc 25 back to the zero reading on scale 28 and again permitting the rotation of the disc 15 carrying scale 16 with disc 25 moving scale 28 to the proper multiplication number under the hair line 30 thereby reading the final result obtained on scale 16.

In the event divisions are to be made, the operation is one of subtraction rather than addition, as in the case of multiplication. Taking, for example, only two figures, as a simple illustration, with both the scale readings at zero the discs 13 and 25 are turned by knob 39 and clutch facings 24' and 24 to position the dividend number on scale 16 under line 30, tension is then applied to the brake band 19 to hold disc 13 stationary while disc 25 is turned to position the division number on scale 28 under the line 30. Thereafter the brake band 19 is released and the knob 39 is turned back until stop 38 meets abutment pin 31, whereupon the result may be read from scale 16 under line 30. In making these calculations it is oftentimes necessary to run off the scale or correct a wrongly dialed figure, which situation is overcome by retracting the abutting pin 31 to permit free rotation of the disc 25, carrying scale 28, to any position desired, with or without disc 15 carrying scale 16 therewith by control of tension on band 19.

Obviously mixed computing operations can be easily performed by dialing the required figures and simply controlling the operation of the disc 15 with respect to the zero settings of disc 25 in accordance with the method provided by the above examples. Further, it will be evident from this description that many computing operations for which a slide rule is used with advantage are possible with this structure and its method of use. Certain modifications in the scale readings and likewise in structure as substitution of a ratchet and pawl for band 19, to control movement of disc 13, or the like.

In its operation, the advantages of the method of calculating as disclosed herein will be apparent in that the scale 28' is always turned in the same direction and back to zero for either multiplication or division and the result is always read at the stationary hair line 30 with less eyestrain and tedious care or attention in setting the desired figures.

Modifications and changes of the embodiment illustrated and described in this specification will readily occur to the expert without departing from the principle of my invention. I therefore desire to limit the scope of my invention by the appended claims.

I claim:

1. A calculating instrument for multiplication and division by addition and subtraction of logarithmic numbers comprising a frame mounting, a stationary transparent cross bar secured over the top of said frame mounting, a pair of identically marked logarithmic scales arranged concentrically in spaced relationship in said frame mounting, one of said scales rotatably supported upon the base portion of said frame mounting, brake means for stopping the movement of said base supported scale, the other of said scales being suspended by the said stationary transparent cross-bar, an indicating line on said cross-bar, friction-face clutch members between said scales, a turn pin attached to one of said scales supported by said cross-bar, stop means on said pin, and abutting means secured on said cross-bar to cooperate with said stop means, whereby the scale attached to said turn pin is automatically set on the zero point at the said indicating line when the said stop means properly engages the said abutting means.

2. A slide rule calculating instrument having an automatic zero setting upon manipulation during addition and subtraction of logarithmic numbers comprising a pair of identical logarithmic scales, positive moving means for one of said scales, friction moving means for the other of said scales cooperatively engaged by said first moving means, control means for rendering the friction moving means operative and inoperative, a stationary indicator line cooperative with each of said scales, stop means on said positive moving means, and retractable abutting means cooperative with said stop means and said indicator line, whereby when said stop means properly engages said abutting means the scale reading on the first of said scales is at the zero point at the indicating line.

3. A slide rule calculating instrument for logarithmically measuring length units comprising indicating media for addition and subtraction of numbers continuously, a framework for mounting said indicating media, a positive actuating means for moving indicating media, indirect driving means for moving another indicating media cooperatively with said positively driven indicating media, control means for stopping the movement of said indirectly driven indicating media, a stationary indicator cooperative with said indicating media, and stop means for said positive actuating means, whereby a fixed reading is automatically indicated by said indicator on the one of said indicating media at said stop means and a calculated figure is indicated by said indicator on another indicating media.

4. A slide rule structure for manipulation of scales in making determinative readings comprising rotatable discs, indicia scales on said discs, a direct drive for one of said discs, a stationary stop means for said direct drive, a drive means for another of said discs cooperative with said directly driven disc, a brake control means cooperative with the latter of said discs for stopping its movement, and a stationary indicator associated with said stationary stop means for making determinative readings from said indicia scales.

KARL A. FISCHER.

REFERENCES CITED

The following references are of record in the file of this patent:

UNITED STATES PATENTS

| Number | Name | Date |
| --- | --- | --- |
| 823,426 | Meilicke | June 12, 1906 |
| 861,303 | Morse | July 30, 1907 |
| 1,075,124 | Scheibli | Oct. 7, 1913 |
| 1,211,581 | Henock | Jan. 9, 1917 |
| 1,424,194 | Brotherton et al. | Aug. 1, 1922 |
| 2,117,155 | Dussell | May 10, 1938 |
| 2,437,722 | Batori | Mar. 16, 1948 |